Dec. 1, 1942.  W. C. MASON  2,303,651

GAUGE

Filed Oct. 18, 1940

INVENTOR
William C. Mason
by
ATTORNEY

Patented Dec. 1, 1942

2,303,651

UNITED STATES PATENT OFFICE 2,303,651

GAUGE

William C. Mason, Slingerlands, N. Y.

Application October 18, 1940, Serial No. 361,696

6 Claims. (Cl. 77—55)

More specifically, my invention relates to a gauge which is particularly adapted for use with lathes, drill presses and other machines in which drilling, boring, tapping and similar machine operations may be carried out.

In some cases, machines which are suitable for use in drilling and performing operations of the character above referred to are provided with a scale to aid the machinist. These machines comprise a movable tool holder or carrier on which the scale is inscribed, and the scale is arranged to be read with reference to an indicator or linear mark on the fixed portion of the machine. It is quite obvious, that, for example, in drilling operations on different work, the drill is not necessarily moved toward the work from its fully retracted position, in each case, through the same distance to the point where it starts to enter the work. In other words, in different drilling operations, the tool and tool carrier may be positioned at different distances from the fixed part of the machine or that part of the machine from which the tool carrier is fed when the drilling operation, in each case, is initially started.

Since as above pointed out the tool and tool carrier do not necessarily bear the same or any predetermined relationship to the fixed part of the machine at the start of actual drilling, the depth to which the drill penetrates can never be read directly on a scale of the character above referred to because the calibration which registers with the fixed line of reference must be noted when the drilling operation starts and the distance therefrom along said scale must be computed in order to determine what calibration should register with the indicator when the work is drilled to the desired depth. In many instances, great accuracy cannot be attained because when the actual machining operation is initially started, the indicator may not register with any one of the calibrations of the scale and the machinist must therefore not only compute but estimate to some extent.

In performing work with machines of the above character, considerable time is wasted in performing the necessary calculations and the chance of error is considerable.

It is a primary object of my invention to provide a gauge which is adapted to be applied to machines in which drilling, tapping and other similar machine operations may be carried out, which gauge will always afford to the machinist a "zero" reading on the scale thereof when the drilling or other machine operation actually starts whereby the depth to which the work is to be drilled may be read directly and consequently accurately on the scale of the gauge.

More particularly, an object of my invention lies in providing a gauge, adapted for use with a machine including a movable tool carrier and a relatively fixed portion, which comprises a scale member and means for fastening said scale member on the movable tool carrier of the machine, said means being characterized by the fact that when in fastening relation to the tool carrier it will move therewith while it may be manually slid therealong whereby for substantially any position of the tool carrier and tool relative to the fixed portion of the machine, the gauge may be slid therealong to adjust the calibrations of the scale thereof relative to some fixed line of reference.

A further object of my invention resides in providing, in combination, a gauge of the foregoing character and a machine comprising a movable tool carrier and a relatively fixed portion, the fixed portion of which is provided with an indicator so arranged that when the gauge is slid along the tool carrier and abuts the fixed portion of the machine said indicator will provide a "zero" reading on the scale member of the gauge.

A still further object of my invention resides in providing a gauge of the above described character which is simple in construction and may be efficiently and very quickly manipulated on the machine with which it is associated to provide a "zero" reading thereon at the start of each drilling or like operation.

With these and other objects in view, my invention includes the novel elements and the combinations and arrangements thereof described below and illustrated in the accompanying drawing in which Fig. 1 is a plan view of my gauge;

Figure 1:
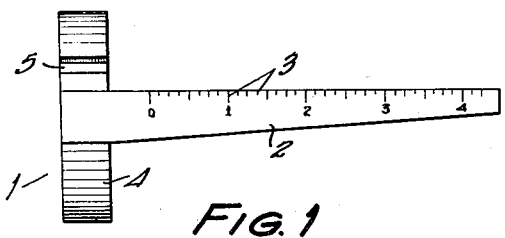
Figure 2:
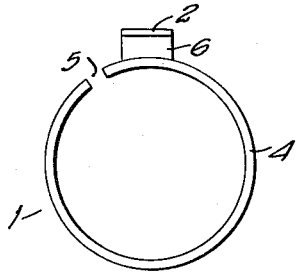
Fig. 2 is an end elevation view thereof.
Figure 3:
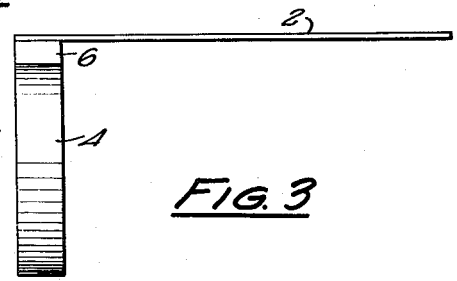
Fig. 3 is a side elevation view thereof.

Referring to the drawing and first to Figs. 1, 2 and 3 wherein I have illustrated a preferred embodiment of my invention, I indicates generally a gauge which comprises a scale member 2 provided with calibrations 3 along one edge thereof. The member 2 is secured to a generally arcuate element or ring 4 which is preferably somewhat resilient and is adapted to be positioned on the movable tool carrier of a machine such as that of the lathe illustrated in Fig. 7. The ring 4 is split as indicated at 5 and preferably a block 6 is interposed between the ring and the scale member 2 in order so to space the member 2 from the ring as to enable it to pass over the tailstock or other relatively fixed portion of the machine with which it is designed for use. The parts may be secured together as by welding or in any other suitable, desired manner.

Figure 7:
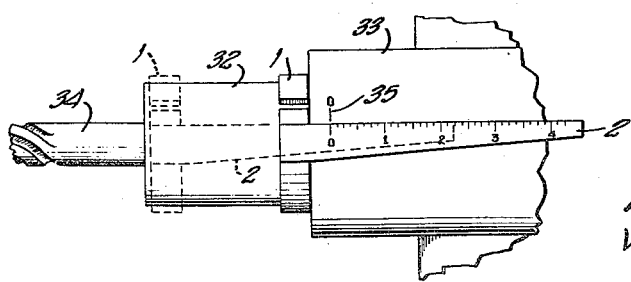
Fig. 7 is a fragmentary plan view of the tailstock and associated tool carrier of a lathe, illustrating my gauge applied thereto.

The split ring 4 is adapted somewhat resiliently and frictionally to engage the movable tool carrier of a machine such as the lathe illustrated in Fig. 7 and is adapted so to engage the tool carrier that it will be moved therewith but may be manually slid therealong.

Figure 4:
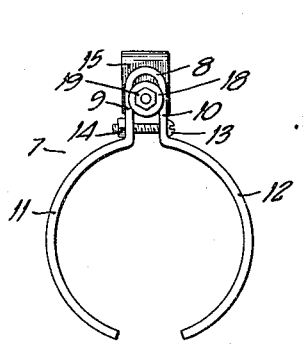
Fig. 4 is an end elevation view of a modification.
Figure 5:
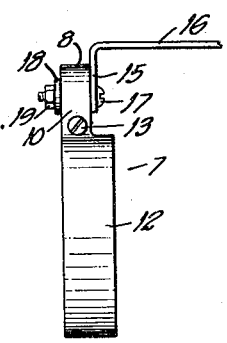
Fig. 5 is a fragmentary side elevation view of the gauge of Fig. 4.

The embodiment of my invention illustrated in Figs. 4 and 5 comprises a resilient element indicated generally at 7 which is overbent in its central portion to provide a generally U-shaped section 8 comprising legs 9 and 10 which extend side by side and terminate in generally arcuate jaws 11 and 12. A bolt 13 is passed through openings in the legs 9 and 10 preferably at the lower ends thereof adjacent the curved jaws and a nut 14 is threaded thereon. A lock nut may be provided if desired. The bolt and nut afford adjustment of the jaws 11 and 12 toward and away from each other whereby the element 7 may be adjusted to fit over and engage with substantially the correct degree of pressure movable tool carriers of different diameters or sizes.

The generally U-shaped section 8 is preferably of substantial length to permit attachment thereto of a scale member and to afford adjustment thereof relative to the element 7. In the embodiment shown, one end 15 of a scale member 16 is overbent, as illustrated, and a bolt 17 is passed through an opening therein and extends between the legs 9 and 10. The overbent end 15 of the scale member is adapted to engage both legs on one side of the generally U-shaped section 8 and a washer 18 which is passed over the bolt 17 is adapted to engage the other side of said legs. A nut 19 is threaded on the bolt 17 and when tightened thereon serves firmly to hold the scale in position. By loosening the nut 19 the scale member may be adjusted lengthwise of the U-shaped section and will be firmly held in adjusted position when the nut and bolt are again tightened.

Since the distance between the outer surface of the fixed portion of the machine with which the gauge may be used and the tool carrier which is movable therewithin may vary, provision for adjustment of the scale member as above described is desirable in order that the scale member may be arranged to extend over but in fairly close proximity to the relatively fixed portion of the machine when the gauge is applied to the movable tool carrier thereof. Obviously, the gauge of Fig. 1 may likewise be arranged to provide for adjustment of the scale member in the manner above described.

Figure 6:
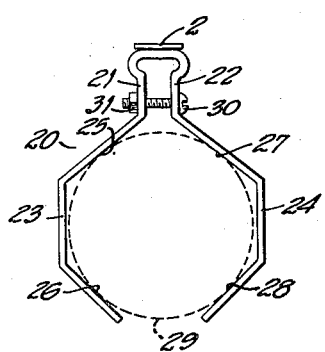
Fig. 6 is an end elevation view of a still further modified form of gauge.

In Fig. 6, I have illustrated a further modified form of my invention in which the tool carrier-engaging element, indicated generally at 20, is formed of resilient material which is overbent in a central portion to provide legs 21 and 22 which extend side by side and terminate in jaws 23 and 24 adapted to engage the movable tool carrier of a machine. The jaws 23 and 24 each comprise angularly disposed portions, arranged, generally speaking, as sides of a prism or a hexagon. The inner surfaces of the jaws such as those indicated at 25 and 26, of jaw 23, and 27 and 28, of jaw 24, are adapted to engage a tool carrier as indicated in dotted lines at 29. The bolt 30 and nut 31 provide for relative adjustment of the jaws 23 and 24, and the portion of element 20 intermediate the legs 21 and 22 may be rounded and somewhat flattened to permit the scale member 2 to be fastened thereto. The tool carrier-engaging element 20 of Fig. 6 may, of course, be so arranged as to provide for adjustment of the scale member relative thereto as in the manner illustrated in Figs. 4 and 5.

When in use, the gauge of my invention is slid over a movable tool carrier such as that indicated at 32 in Fig. 7 wherein I have illustrated the tailstock 33 of a lathe. Thereafter the shank of a tool, such as the drill 34, is inserted in the tool carrier. In presenting the tool to the work, the tool carrier 32 moves outwardly from the tailstock 33 carrying the gauge 1 therewith as indicated in dotted lines. The tool is moved forwardly until it is at the point of entering the work. With the tool so positioned, the gauge 1 is manually slid along the tool carrier 32 until it abuts the face of the tailstock 33. Preferably, the tailstock is provided on its surface with an indicator or a linear indication 35 which is so spaced from the face of the tailstock that it will register with the "zero" calibration on the scale member 2 when the ring 4 of the gauge abuts the face of the tailstock. From this point, the degree to which the tool moves into the work may be read directly on the scale member 2 since the gauge will move with the tool, moving the scale thereof relative to the indicator 35. Since the gauge may always be moved to abut the face of the tailstock for practically any position of the tool and tool carrier, all machine operations, such as drilling and the like, may in every instance be performed accurately and the depth to which the operation is performed read directly on the scale of the gauge.

The gauge of my invention is particularly characterized by its simplicity, the speed with which it may be used and the accuracy afforded thereby. A "zero" reading may at any time be obtained on the scale simply by moving the gauge against the tailstock.

It will be understood, as hereinbefore pointed out, that my invention is adapted for use on lathes, drill presses and other machines where it is desirable to measure the tool movement relative to the work.

While I have described my invention in its preferred embodiments, it is to be understood that the words which I have used are words of description rather than of limitation and that changes within the purview of the appended claims may be made without departing from the true scope and spirit of my invention in its broader aspects.

What I claim is:

1. In a gauge of the character described adapted for use with a machine including a movable tool carrier and a relatively fixed portion, a scale member of substantial length having calibrations arranged in a series extending longitudinally thereof, and resilient means secured to said scale member against bodily movement longitudinally thereof, said resilient means being adapted firmly to engage the movable tool carrier for fastening said scale member thereon with the series of calibrations thereon extending in the direction of movement of said carrier, said means being arranged frictionally to engage said tool carrier with sufficient tightness that said scale member will be stably supported thereon and will move therewith but said means being manually slidable on said tool carrier whereby it may be moved to adjust the calibrations on said scale relative to a reference indicator on said fixed portion of the machine.

2. In a gauge of the character described adapted for use with a machine including a movable tool carrier and a relatively fixed portion, a generally arcuate, resilient, split element adapted to engage the movable tool carrier with sufficient tightness as to be stably supported thereon and to move therewith but manually slidable thereon and a scale member provided with calibrations arranged in a series extending longitudinally thereof, said scale member being secured to said element against longitudinal movement relative thereto and extending generally in the direction of the axis of said arcuate element whereby said gauge may be stably positioned on said tool carrier and will move therewith but may be manually slid therealong accurately to position its "zero" calibration on a fixed line of reference on said fixed portion of the machine at substantially any position of said tool carrier and the magnitude of movement of said carrier from such position read directly on said scale.

3. In a gauge of the character described adapted for use with a machine including a movable tool carrier and a relatively fixed portion, a scale member of substantial length having calibrations arranged in a series extending longitudinally thereof, and means secured to said scale member against bodily movement longitudinally thereof, said means comprising a pair of relatively movable, resilient arms relatively movable in a direction substantially normal to said scale member and adapted firmly to engage the movable tool carrier and to fasten said scale member thereon with the series of calibrations thereon extending in the direction of movement of said carrier, said arms being adapted to engage said tool carrier with sufficient tightness that said scale member will be stably supported thereon and will move therewith but being manually slidable on said carrier whereby said scale member may be moved to adjust the calibrations thereof relative to a fixed line of reference on said fixed portion of the machine.

4. In a gauge of the character described adapted for use with a machine including a movable tool carrier and a relatively fixed portion, a scale member of substantial length having calibrations arranged in a series extending longitudinally thereof, means comprising a pair of relatively movable, resilient arms when free from flexing stresses relatively movable in a direction substantially normal to said scale member and adapted firmly to engage the movable tool carrier and to fasten said scale member thereon with its calibrated edge extending in the direction of movement of said carrier, said arms being adapted to engage said tool carrier with sufficient tightness that said scale member will be stably supported thereon and will move therewith but being manually slidable on said carrier whereby said scale member may be moved to adjust the calibrations thereof relative to a fixed line of reference on said fixed portion of the machine, and means for adjusting said arms toward and away from each other.

5. In a gauge of the character described adapted for use with a machine including a movable tool carrier and a relatively fixed portion, a scale member of substantial length and being calibrated in a lengthwise direction thereof, resilient means adapted firmly to engage the movable tool carrier for fastening said scale member thereon with its calibrations extending in a series in the direction of movement of said carrier, said means being arranged frictionally to engage said tool carrier with sufficient tightness that said scale member will be stably supported thereon and will move therewith but said means being manually slidable on said tool carrier whereby it may be moved to adjust the calibrations on said scale relative to a reference indicator on said fixed portion of the machine, and means for adjustably fastening said scale member to said resilient, carrier-engaging means.

6. In a gauge of the character described and adapted for use with a machine including a movable tool carrier and a relatively fixed portion, a scale member of substantial length and being calibrated in a lengthwise direction thereof, and means fixed against bodily movement longitudinally of said scale for fastening said scale member on a movable tool carrier, said fastening means being arranged frictionally to engage said tool carrier with sufficient tightness as to stably support said scale member thereon and to cause said scale member to move therewith but said gauge being manually slidable on said tool carrier whereby it may be moved to adjust the calibrations on said scale member relative to a reference indicator on said fixed portion of the machine.

WILLIAM C. MASON.